Aug. 24, 1965   R. P. DUMM   3,202,175
NIPPLE ATTACHMENT TO A VALVE BODY
Filed May 6, 1963   2 Sheets-Sheet 1
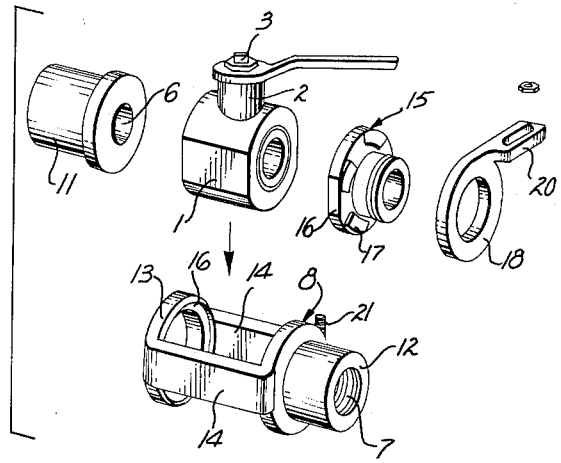
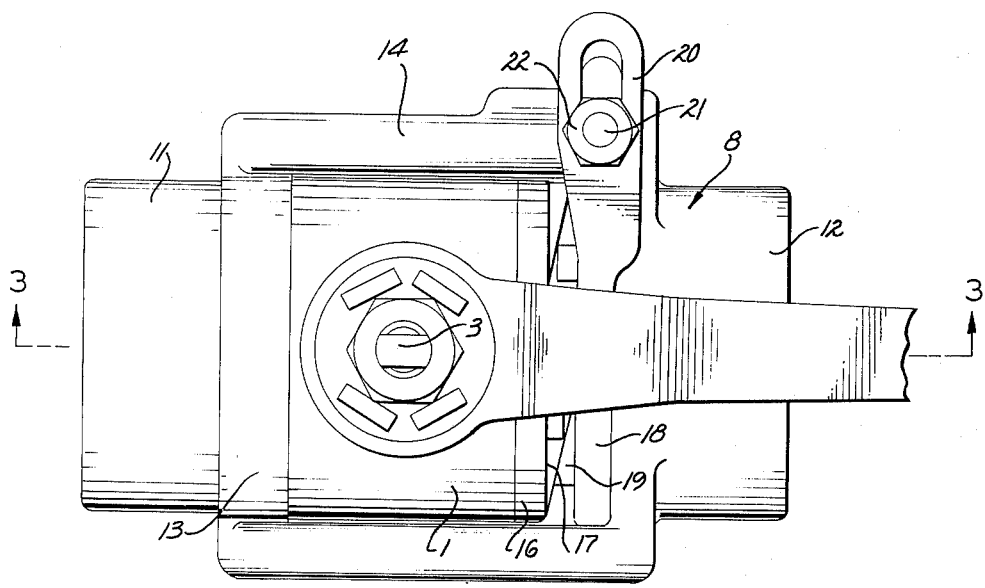
INVENTOR.
ROBERT P. DUMM
BY
ATTORNEY Aug. 24, 1965 R. P. DUMM 3,202,175
NIPPLE ATTACHMENT TO A VALVE BODY
Filed May 6, 1963 2 Sheets-Sheet 2

INVENTOR.
ROBERT P. DUMM
BY
ATTORNEY 3,202,175
NIPPLE ATTACHMENT TO A VALVE BODY
Robert P. Dumm, Long Beach, Calif., assignor to Pacific Valves, Inc., Long Beach, Calif., a corporation of California
Filed May 6, 1963, Ser. No. 278,360
3 Claims. (Cl. 137—454.2)

This invention relates to a nipple attachment to a valve body, and is a continuation in part of my co-pending application Serial No. 119,497, filed June 26, 1961, entitled, "Valve Mounting in a Nipple Assembly," now abandoned.

An object of my invention is to provide a novel valve mounting in a nipple assembly whereby the valve body is securely held in the nipple assembly by a cam member which is pressed against the valve body and against the nipple assembly.

Another object of my invention is to provide a novel nipple attachment to a valve body wherein a cam ring is rotated against a compression ring by means of an arm on the cam ring.

Another object of my invention is to provide a novel nipple attachment to a valve body whereby the cam ring can be quickly and easily released from engagement with a compression ring, to permit the body of the valve to be entirely removed from the nipple assembly.

Other objects, advantages and features of my invention may appear from the accompanying drawing, the subjoined description and the appended claims.

In the drawing:

FIGURE 1 is a disassembled perspective view of my nipple attachment to a valve body.

FIGURE 2 is a top plan view of my nipple attachment and the valve body.

Figure 3:
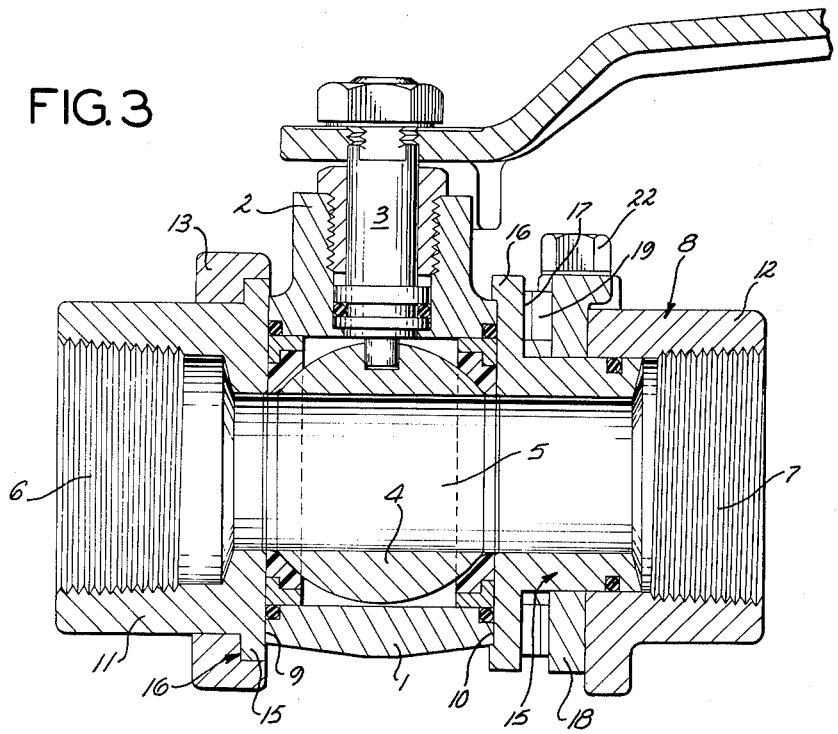
FIGURE 3 is a vertical sectional view taken on line 3—3 of FIGURE 2.
Figure 4:
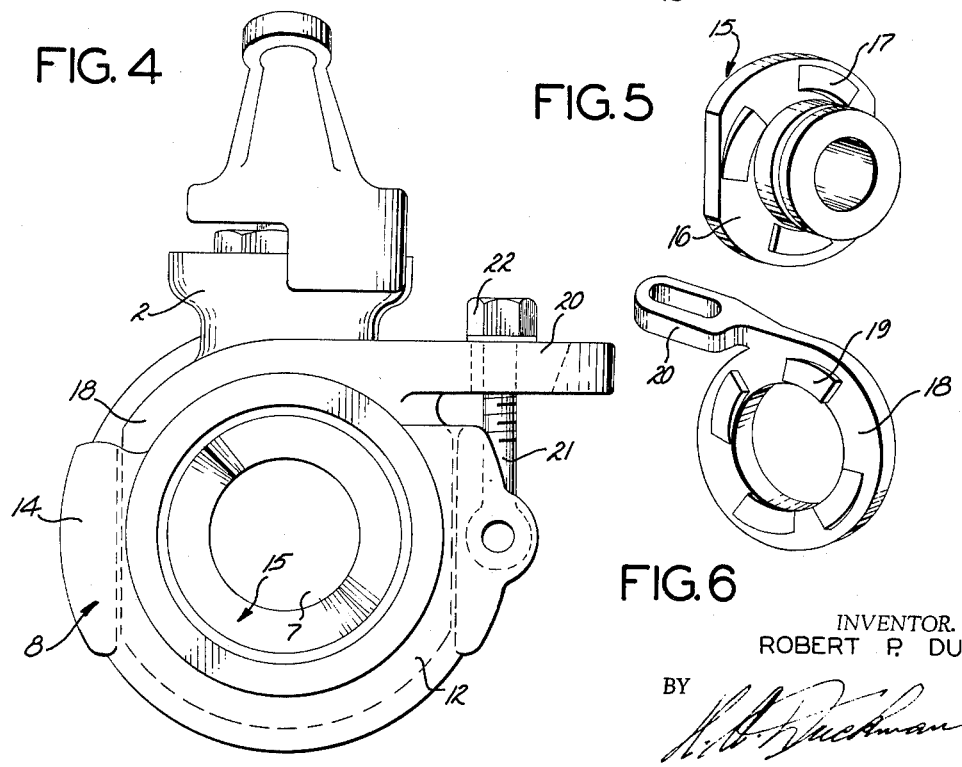
FIGURE 4 is an end view of the nipple attachment and the valve body.
Figure 5:
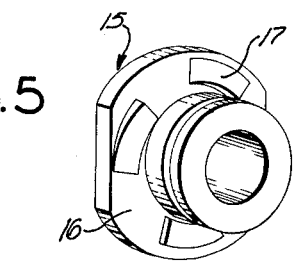
FIGURE 5 is a perspective view of the compression ring.
Figure 6:
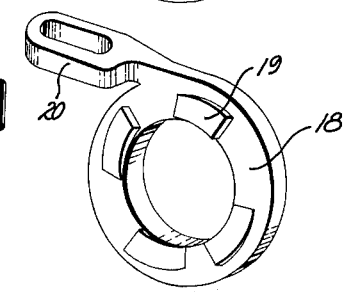
FIGURE 6 is a perspective view of the cam ring.

Referring more particularly to the drawing, the numeral 1 indicates the body of a valve, which body includes a bonnet 2 through which the valve control stem 3 extends. A ball or rotatable element 4 is mounted within the body 1 in the usual and well known manner, and this ball is controlled by the stem 3 to move the ball to open or closed positions. The ball 4 is formed with a transverse passage 5 which is alignable in one position of the parts, with the intake port 6 and the outlet port 7 of the nipple attachment 8. The body 1 is formed with two opposite flat machined surfaces of the nipple attachment 8, as will be subsequently described. The nipple assembly 8, in which the body 1 of the valve is fitted, consists of two spaced nipples 11 and 12. These nipples are threaded onto or otherwise detachably secured to the ends of pipe in which the valve is mounted. A mounting ring 13 is connected to the nipple 12 by a pair of integral ribs or webs 14—14. The nipple 11 is mounted in the ring 13 by means of the flange 15 on the nipple, this flange resting in a seat 16 formed in the mounting ring 13. The nipples 11–12 are thus fixedly spaced relative to each other, but an opening is provided at both the top and the bottom between the ribs 14 to permit entry and removal of the body 1 of the valve. The nipples 11–12 are in alignment with the passage 5 of the ball 4 when the valve is in open position.

To hold the valve body 1 in proper aligned position between the nipples 11–12, and also to permit rapid disassembly or removal of the valve body 1 from the nipples 11–12, I provide means to engage and exert pressure against the opposite side faces 9–10 of the valve body 1. This engaging means consists of a compression ring 15 which is formed with a flange 16 engageable with the face 10 of the valve body 1. A plurality of cam surfaces 17 are provided on the outer face of the flange 16, and the purpose of these surfaces is to cam the compression ring 15 tightly against the face 10 of the valve body 1. A cam ring 18 encircles the compression ring 15 and is provided with cam segments 19 which engage the cam surfaces 17 for the purpose of camming the compression ring towards the valve body 1. The cam ring 18 can be rotated relative to the compression ring 15, and this rotation is best accomplished by the arm 20, which is an integral part of the cam ring. The cam ring 18 can be held in proper adjusted position to compress the ring 15 against the valve body 1 by means of the bolt 21 which is attached to the nipple assembly 8 and engages the arm 20. The nut 22 on this bolt can also be used to securely tighten the cam ring 18 against the compression ring 15 so that all of the parts will be securely held in assembled position.

Having described my invention, I claim:

1. A nipple attachment to a valve body comprising a pair of spaced nipples,
    ribs extending between said nipples,
    said ribs defining a valve receiving chamber therebetween, and said nipples being positioned one at each end of the valve receiving chamber,
    the valve including a body having a passage therethrough aligned with said nipples,
    said chamber being open on at least one side thereof to allow entrance of the valve body therethrough,
    a compression ring in said chamber bearing against one face of the valve body, and slidably mounted in one of the nipples,
    cam surfaces on a face of the compression ring,
    and a cam ring rotatably mounted in said chamber and rotatably engaging said compression ring to press the compression ring against the valve body.

2. A nipple attachment to a valve body comprising a pair of spaced nipples,
    ribs extending between said nipples,
    said ribs defining a valve receiving chamber therebetween,
    the valve including a body having a passage therethrough aligned with said nipples,
    said chamber being open on at least one side thereof to allow entrance of the valve body therethrough,
    a compression ring in said chamber bearing against one face of the valve body, and slidably mounted in one of the nipples,
    a cam ring rotatably mounted in said chamber and engaging said compression ring to press the compression ring against the valve body,
    and an arm projecting from the camming and positioned on the outside of the nipple attachment, a bolt extending from one of the nipples and mounted thereon, said bolt engaging said arm to rotate the cam ring relative to the compression ring.

3. A nipple attachment to a valve body comprising a pair of spaced nipples,
    ribs extending between said nipples,
    said ribs defining a valve receiving chamber therebetween,
    the valve including a body having a passage therethrough aligned with said nipples,
    said chamber being open on at least one side thereof to allow entrance of the valve body therethrough, a compression ring in said chamber bearing against one face of the valve body, and slidably mounted in one of the nipples, cam surfaces on a face of the compression ring, and a cam ring rotatably mounted in said chamber and engaging said compression ring to press the compression ring against the valve body, and an arm projecting from the cam ring and positioned on the outside of the nipple attachment, a bolt extending from one of the nipples and mounted thereon, said bolt engaging said arm to rotate the cam ring relative to the compression ring.

References Cited by the Examiner

UNITED STATES PATENTS

| | | | |
|---|---|---|---|
| 231,283 | 8/80 | Cushing | 251—162 |
| 2,416,787 | 3/47 | White | 137—219 XR |
| 2,514,532 | 7/50 | Allen et al. | 29—157.1 XR |
| 2,564,147 | 8/51 | Bowling | 251—162 |
| 2,639,883 | 5/53 | Smith | 251—170 |
| 2,740,423 | 4/56 | Stillwagon | 137—454.2 |
| 2,985,425 | 5/61 | Tang | 251—367 XR |

M. CARY NELSON, *Primary Examiner.*

LAVERNE D. GEIGER, *Examiner.*